Dec. 4, 1956  P. B. CLARK ET AL  2,773,173
LIGHT PROJECTOR

Filed June 15, 1953  2 Sheets-Sheet 1

INVENTOR.
Philip B. Clark
Joseph G. Atwood
BY
Arnold J. Ericson
Attorney

United States Patent Office 2,773,173
Patented Dec. 4, 1956

2,773,173

LIGHT PROJECTOR

Philip B. Clark, South Milwaukee, and Joseph G. Atwood, Wauwatosa, Wis., assignors to McGraw Electric Company, Milwaukee, Wis., a corporation of Delaware Application June 15, 1953, Serial No. 361,706

4 Claims. (Cl. 240—1.2)

The present invention relates to light projectors, and is particularly directed to a means of access to operating members located interiorly of the light projector.

It is an object of the present invention to provide a means of access to the interior portions of a light projector having a lens that is normally in fixed position, which means permits access without disturbing the lens or other portions of the optical structure for routine maintenance operations.

It is another object of the present invention to provide a movable reflector for a light projector which reflector is normally biased towards operating position to provide predetermined light direction, and which may be moved to a second position for permitting access to interior operating parts for routine maintenance operations without the disturbance of other reflectors or projector lenses.

It is a further object of the present invention to provide a pivoted reflector and pivoted access door for a light projector, which door and reflector are swingable to a position permitting access to the interior portions of a light projector without the disturbance of other reflectors or lens structures.

It is still another object of the present invention to provide a pintle pin for an access door normally acting as a closure for a light projector housing, which pin is tubular in form and has both ends open to permit rough alignment sightings to be made therethrough for initial alignment of a series of light projectors stationed along a relatively straight path, such as an airport runway.

These and other important objects of the present invention will become more apparent from the following detailed description when read in conjunction with the drawings, in which.

In practicing the invention in its preferred form, it comprises the housing and lens combination heretofore disclosed in copending application, Serial No. 328,631, filed on December 30, 1952, by Philip B. Clark, and assigned to the same assignee as is the present invention.

Figure 1:
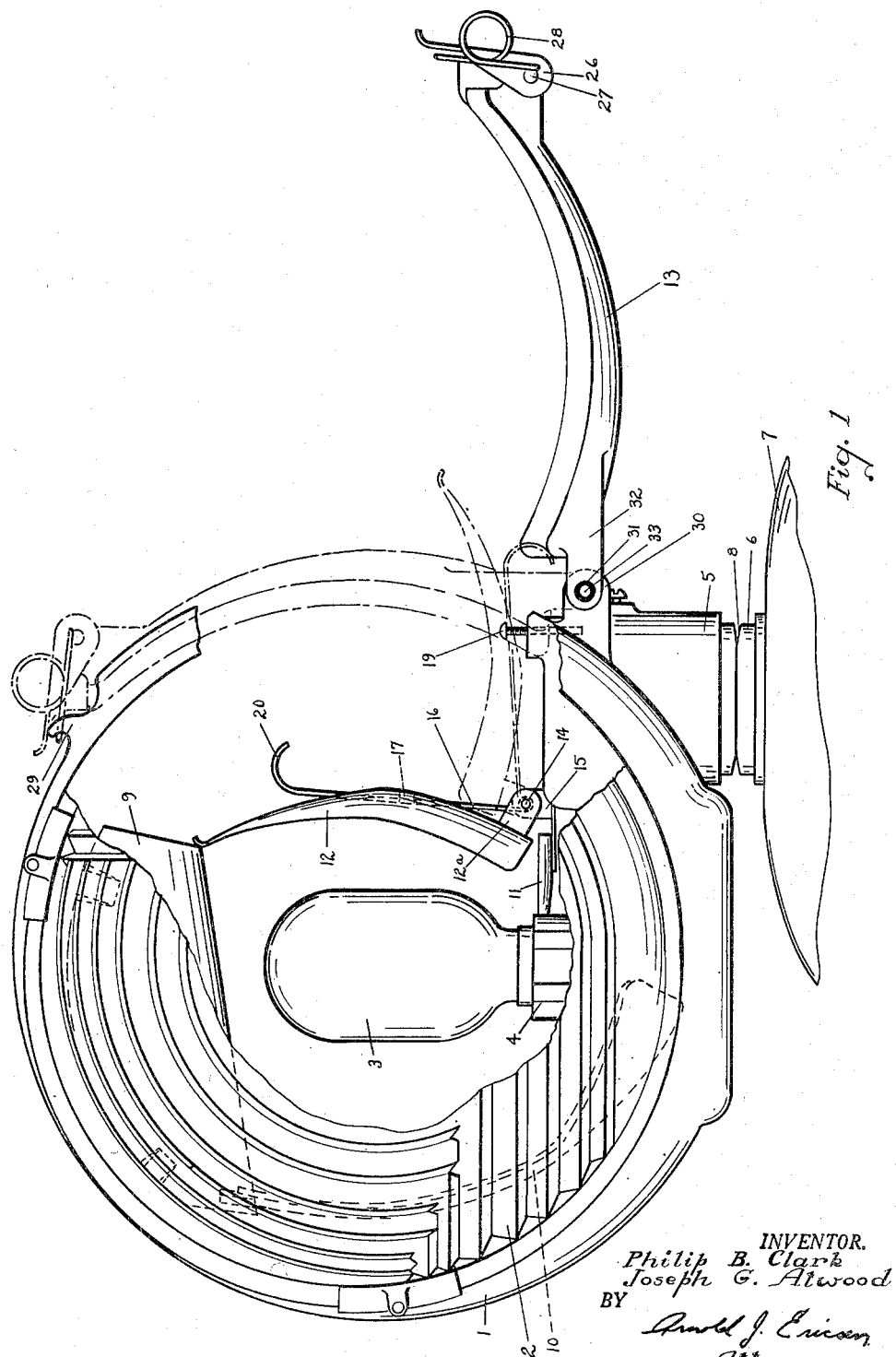
Fig. 1 is a side elevational view, partly in fragment, of a light projector embodying the principal features of the present invention.
Figure 2:
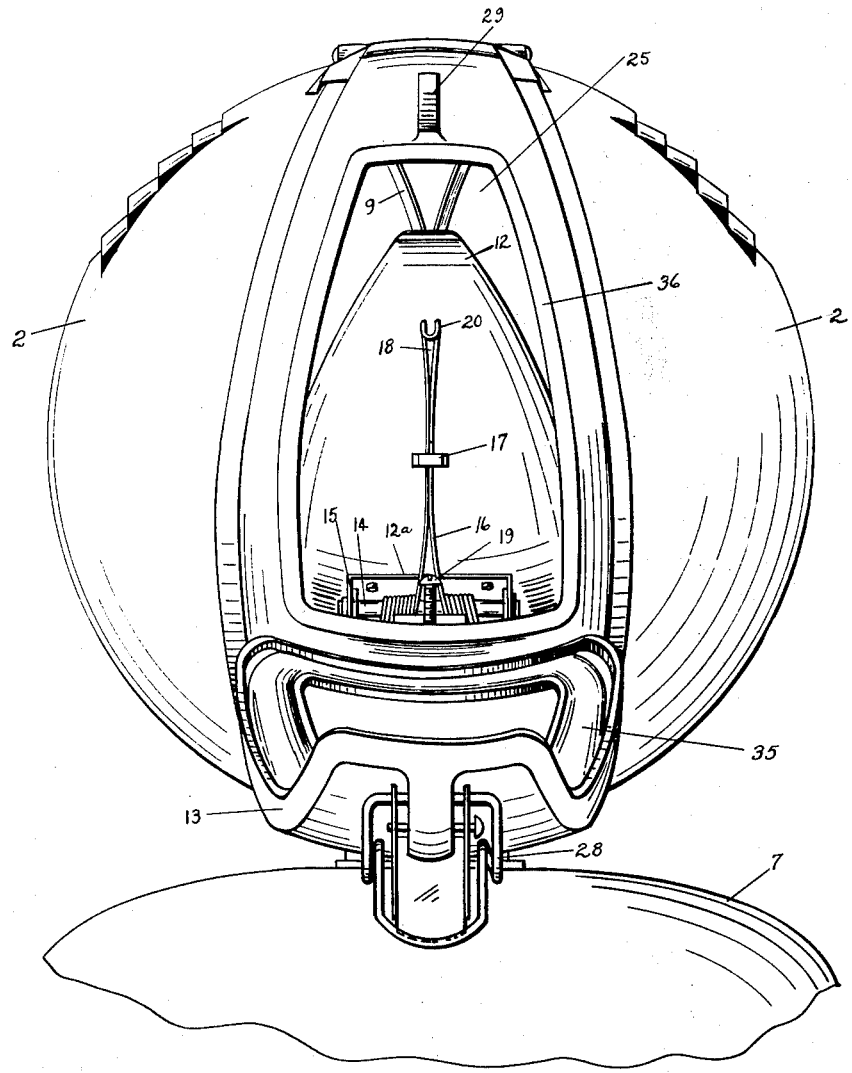
Fig. 2 is a view in end elevation of a projector with the access door in open position to show certain of the operating portions within the interior of the projector.

Referring now to the drawings, it will be observed that there is shown in Fig. 1 an airport runway light projector comprising, generally, a housing 1, a reversible projection lens 2 which may be mounted on either side of the housing as shown in Fig. 2, and the projection lamp 3 mounted in a socket member 4. The housing is conveniently positioned on a slip-fitter member 5 embracing a support member 6 projecting from a base 7. The support member 6 preferably includes a frangible portion in the form of an annular groove 8.

The particular projector described utilizes a number of reflectors, including a top reflector 9, a front reflector 10 and a bottom reflector 11.

The novel aspects of this invention lie in the provision of a back reflector 12 and an access door 13, which are operable as shown in Fig. 1 and disclosed in greater detail in Fig. 2. The back reflector may be formed in any manner suitable to the proper distribution and projection of light beams emanating from the projector according to its application. The preferred embodiment as shown in both figures includes a reflector 12 which is preferably polished to a specular finish on the side facing the lamp 3, and is securely mounted on a U-shaped bracket 12a. The bracket has its projecting arms pivotally engageable with a pintle pin 14 positioned in mounting trunnions 15 secured to the housing 1. The arrangement also preferably includes a torsional spring 16 having one end helically wound about the pintle pin 14 and secured to or stopped against the housing 1 or trunnion 15 to prevent rotational motion thereof. The spring 16 is preferably extended upwardly as shown threaded through a retaining portion 17 which may be sheared and drawn in the reflector 12. The resilient spring defines an opening 18 at its upper end which is engageable with the head of a machine screw 19 mounted in the housing 1 for a purpose hereinafter described. The upper extremity 20 of the spring 16 is hook-formed to provide a finger hold for moving the reflector about its pivot.

Referring now to the novel access door 13, the door is preferably pivotally mounted, and is normally latched in closed position to cover the access opening 25 in the housing 1. The latch arrangement may be provided from a conventional trunk-type latch 26 pivoted on the pin 27 projecting through the upper portion of the door 13 and including a U-shaped latch spring 28 engageable with a hook portion 29 integrally cast in the housing 1.

As has been stated previously, the door 13 is preferably pivotally mounted on the housing, and swingable outwardly to open position as shown in the full lines in Fig. 1, and in more detail in Fig. 2. Mounting trunnions 30 are cast in the housing and are adapted to receive a pintle pin 31 from which the door 13 is also pivoted on its trunnions 32. The interior surface of the door is fitted with a gasket member 35, which provides a moisture-proof seal with a raised flange portion 36 defining the opening 25 in the housing 1.

The pintle pin 31 may be provided in the form of a tubular member having an opening 33 extending therethrough. The tubular pin 31 is preferably flared outwardly to provide retaining portions at either end. The particular projector provided by the above-mentioned copending application, Serial No. 328,631, is preferably used as a runway light for aiding in landing and take-off operations of aircraft. In such application, there is provided parallel rows of lamps that are positioned in an aligned series. It will be apparent that for a true alignment, the installer will need surveying instruments. However, the lamps must be initially aligned prior to such final setting. The tubular pin provides a convenient means for sighting during such rough alignment.

In practice, the novel features of the present invention operate as follows:

As is very often the case in light projectors utilizing relatively high-wattage projector lamps, it is very often necessary to replace burnt-out lamp bulbs and to make minor adjustments within the interior of the projector housing. Heretofore, it has been the practice to provide projectors that require removal of the lens or lenses to gain access to the interior. The lens was either mounted with threaded machine screws retaining the clamping means, or mounted with releasable spring-tensioned devices. It will be apparent that the former mounting arrangement required considerable effort to remove the screws each time it was necessary to gain access of the interior. The latter-mentioned, spring-tensioned devices have never proved adequate for complete water-proof protection of the lens-housing seal, though they were relatively easier to remove for replacement of the lens or for gaining access to the interior of the projector. The present invention proposes a structure that overcomes all of the heretofore undesirable aspects.

When the operator desires to work on interior portions or replace projector lamps, all he need do is unlatch the door 13 from the hook 29 and swing the door on the pivot to the position shown in the full lines of Fig. 1. The access opening 25 will then be exposed as shown in Fig. 2. The hook portion 20 of the torsion spring 16 on the reflector 12 is then grasped with the finger and rocked on its pivot to the dotted line position of Fig. 1. The opening 18 of the spring 16 is then expanded on the sloping head of the screw 19 to pass over the head and subsequently engages underside of the head of the machine screw 19. The reflector will then be temporarily locked in open position out of the way for convenient access to the interior by the operator.

After the necessary maintenance operations have been completed, the opening 18 and the spring 16 is distended slightly with finger pressure to permit the spring to pass the head of the screw 19. The reflector 12 is then permitted to resume its normal operating position against the biasing forces of the spring 16, as shown in the full lines of Fig. 1 and as shown in Fig. 2. The reflector 12 will then be conveniently stopped against one end of the upper reflector 9. The door 13 is next rocked on its pintle pin 31 to closed position as shown in dotted lines on Fig. 1 with the latch 26 engaging the hook 29. The gasket 35 provides an adequate moisture seal with the raised flange portion 36 of the housing 1.

It will be apparent that a new and convenient means for gaining access to light projectors has been provided, wherein it has heretofore been found to be undesirable to remove the lens units from the projector for routine maintenance operation. This means of access does not interfere with any of the moisture-proof requirements for light projectors that are ordinarily positioned in out-of-door installations, and further does not disturb the prescribed optical features or the main operating components of the light projector.

We claim:

1. In a light projector comprising a housing having a lens-receiving opening, a lens positioned in said opening and a projector lamp having a longitudinal axis therethrough; said housing defining an access opening therein, a removable closure for said access opening, a pivotally mounted reflector for said lamp positioned intermediate said lamp and said access opening, the axis of rotation of said pivotally mounted reflector being substantially normal to said longitudinal axis of said projector lamp, said reflector being pivotally movable from a normal reflecting position relative to said lamp axis to a second operating position, said reflector and said closure being in spaced apart relationship and each being independently movable relative to one another, whereby said reflector may be pivotally rocked to said second position and said closure may be removed to open position to permit manual access to the interior of said housing with said lens remaining undisturbed in normal operating position.

2. In a light projector comprising a housing having a lens-receiving opening, a lens positioned in said opening and a projector lamp having a longitudinal axis therethrough; said housing defining an access opening therein, a pivotally mounted closure for said access opening, a pivotally mounted reflector for said lamp positioned intermediate said lamp and said access opening, the axis of rotation of said pivotally mounted reflector being substantially normal to said longitudinal axis of said projector lamp, said reflector being pivotally swingable from a normal reflecting position relative to said lamp axis to a second operating position, the pivot points of said reflector and said closure being in spaced apart relationship, whereby said reflector may be pivotally rocked to said second position and said closure may be pivotally rocked to open position to permit manual access to the interior of said housing with said lens remaining undisturbed in normal operating position.

3. In a light projector comprising a housing having a lens-receiving opening, a lens positioned in said opening and a projector lamp; said housing defining an access opening therein, a pivotally mounted closure for said access opening, a pivotally mounted reflector for said lamp positioned intermediate said lamp and said access opening and pivotally swingable from a normal reflecting position relative to said lamp to a second operating position, biasing means normally urging said reflector towards reflecting position, the pivot points of said reflector and said closure being in spaced apart relationship, releasable latch means for temporarily retaining said reflector in said second operating position, whereby said reflector may be pivotally rocked to said second position and said closure may be pivotally rocked to open position to permit manual access to the interior of said housing with said lens remaining undisturbed in normal operating position.

4. In a light projector comprising a housing having a lens-receiving opening, a lens positioned in said opening and a projector lamp; said housing defining an access opening therein, a pivotally mounted closure for said access opening, said closure being pivotally suspended between spaced apart trunnions integral with said housing and including a tubular supporting pintle pin having a thru bore open at both ends, a pivotally mounted reflector for said lamp positioned intermediate said lamp and said access opening and pivotally swingable from a normal reflecting position relative to said lamp to a second operating position, biasing means normally urging said reflector towards reflecting position, the pivot points of said reflector and said closure being in spaced apart relationship, releasable latch means for temporarily retaining said reflector in said second operating position, whereby said reflector may be pivotally rocked to said second position and said closure may be pivotally rocked to open position to permit manual access to the interior of said housing with said lens remaining undisturbed in normal operating position.

References Cited in the file of this patent

UNITED STATES PATENTS

| | | |
|---|---|---|
| 1,836,845 | Halvorson | Dec. 15, 1931 |
| 1,890,167 | Sheely | Dec. 6, 1932 |
| 1,987,744 | Livingston | Jan. 15, 1935 |
| 2,070,195 | Bissell et al. | Feb. 9, 1937 |